United States Patent [19]

Sanders

[11] Patent Number: 5,035,390

[45] Date of Patent: Jul. 30, 1991

[54] ADAPTER FOR ATTACHING AN ANIMAL CALL TO A FIREARM

[76] Inventor: Joseph Sanders, Box 1100 Davidson Ave., Elrama, Pa. 15038

[21] Appl. No.: 507,864

[22] Filed: Apr. 11, 1990

[51] Int. Cl.⁵ ............................................. A01M 31/00
[52] U.S. Cl. ..................................... 248/231; 446/397
[58] Field of Search .................. 248/229, 231; 446/397

[56] References Cited

U.S. PATENT DOCUMENTS

| 746,188 | 12/1903 | Sonsthagen | 248/229 |
|---|---|---|---|
| 1,362,432 | 12/1920 | Masters | 248/229 |
| 1,452,651 | 4/1923 | Norrlin | 248/229 X |
| 1,702,101 | 2/1929 | Basterreix | 248/229 X |
| 1,735,212 | 11/1929 | Pawsat | 248/229 |
| 2,179,251 | 11/1939 | DeRight et al. | 248/229 |
| 2,338,200 | 1/1944 | Patterson | 248/229 X |
| 2,601,613 | 6/1952 | Jahncke | 248/229 |
| 2,674,428 | 4/1954 | Davis et al. | 248/229 |
| 2,689,995 | 9/1954 | Smith | 248/229 X |
| 3,447,727 | 6/1969 | Lowe | 248/229 X |
| 4,862,625 | 9/1989 | Dolan | 446/397 X |

Primary Examiner—David L. Talbott
Attorney, Agent, or Firm—Reed Smith Shaw & McClay

[57] ABSTRACT

The present invention provides for an adapter that is used to attach an animal call, such as a turkey call, to a shotgun or rifle in a manner that allows the hunter to activate the call to lure the quarry into closer range without ever taking the game out of the firearm's sight. The adapter is specifically designed to accommodate a wide variety of animal call shapes and sizes. Additionally, the adapter is designed to be completely assembled and adjusted for proper alignment in the field without the use of any hand tools.

17 Claims, 1 Drawing Sheet

ADAPTER FOR ATTACHING AN ANIMAL CALL TO A FIREARM

FIELD OF THE INVENTION

The present invention relates to an adapter used to attach an animal call, such as a turkey call, to a shotgun or rifle in a manner that allows the hunter to activate the call to lure the quarry into closer range without ever taking the game out of the firearm's sight.

BACKGROUND OF THE INVENTION

A variety of adapters have been known and used to attach various devices to a firearm. Particularly, U.S. Pat. Nos. 1,236,947; 2,416,769; 3,062,114; 3,678,590; 3,739,167; 4,152,754; 4,233,770; 4,290,219; 4,291,479; 4,309,095; 4,533,980; and 4,542,447 all disclose devices such as lights, cameras, and illuminated sights that are attached to a firearm. None of these adapters, however, relate to mounting an animal caller, such as a turkey call, to a firearm. In the wild, in the heat of the hunt, the hunter is often in the position of being unable to make an animal call and quickly adjust to take aim once the animal is lured in the hunter's direction. Previously, the hunter was required to make the call, put the call down, pick up the animal in his sights, often within a few seconds. It would be desirable, therefore, to provide for an adapter that could be used to mount an animal call to a firearm in such a manner that the hunter can activate the call without ever taking the quarry out of the sight of the firearm.

SUMMARY OF THE INVENTION

The present invention provides an adapter for attaching an animal call to a firearm so that a hunter can activate the call without ever taking the quarry out of the firearm's sight, comprising: a first bracket that is capable of being attached to the firearm; a second bracket, connected to the first bracket, that is capable of holding the animal call; and a means for activating the animal call that attaches to the second bracket, contacts the activator of the animal call, and preferably extends from the activator of the animal call to the trigger area of the firearm. Once an animal is spotted by a hunter, therefore, the hunter can aim his rifle or shotgun at the quarry and then proceed to activate the animal call to lure the game into closer range while still aiming the firearm at the game.

The two brackets and the means for activating the call are attached to each other preferably by means of threaded connections that allow the adapter to be assembled in the field without any outside tools. This feature also allows the three main components of the adapter to be adjusted with respect to each other to provide for proper alignment of the adapter.

The adapter of the present invention is very versatile and can be adjusted to fit a wide variety of firearms as well as a wide variety of animal calls that require manual movement of a lever or a button (as opposed to an animal call, such as a duck call, that is blown by the hunter). The first bracket is designed to fit the butt of virtually any rifle and shotgun available. The second bracket is designed as a clamp with replaceable brackets to accommodate rectangular, round, or any other shape of animal call. Finally, the activating means is designed in two pieces connected by a swivel mechanism to provide a wide range of motion to accommodate the activator of most animal calls available.

Other details, objects, and advantages of the present invention will become more readily apparent from the following description of a presently preferred embodiment thereof.

BRIEF DESCRIPTION OF THE DRAWINGS

In the accompanying drawings, a preferred embodiment of the present invention is illustrated, by way of example, wherein.

DESCRIPTION OF THE PREFERRED EMBODIMENT

Figure 1:
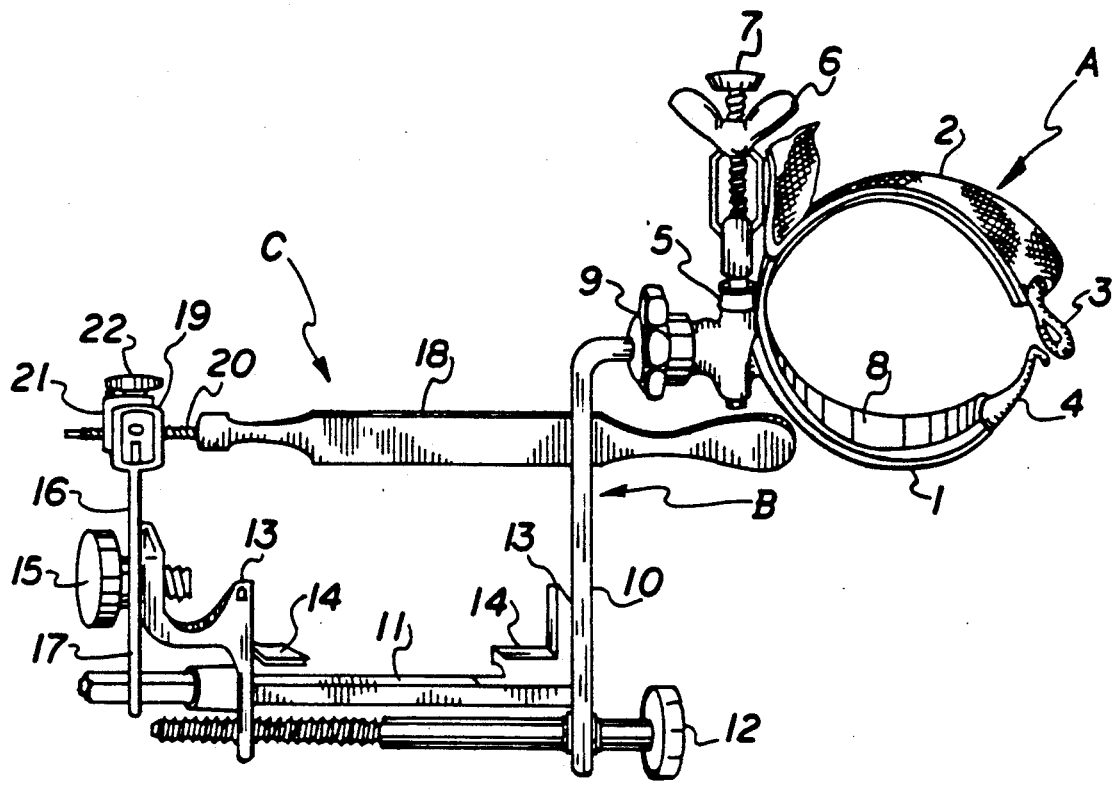
FIG. 1 shows a perspective view of the adapter of the present invention and FIG. 2 shows a perspective view of the adapter attached to a shotgun (shown in phantom lines) holding a turkey call in place.
Figure 2:
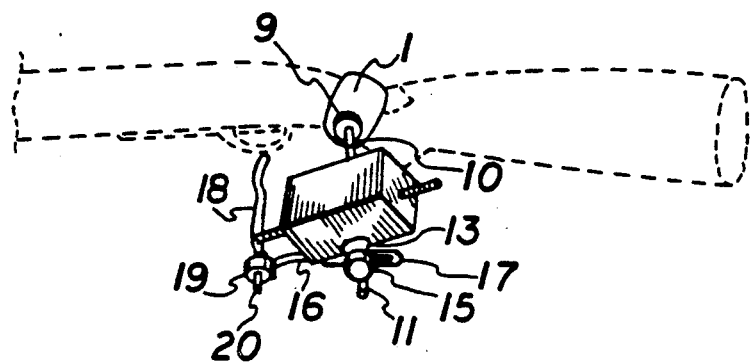

FIG. 1 shows a preferred embodiment of the adapter of the present invention that is specifically designed to attach a turkey call to a shotgun. It comprises a first bracket made from a flexible strap that wraps around the front of the butt of the shotgun, a clamp designed specifically to hold a rectangularly shaped turkey call, and an activating means that contacts the activator of the turkey call and extends on to the trigger area of the shotgun. FIG. 2 shows this preferred embodiment attached to a shotgun, holding the turkey call in place so that a hunter can activate the call without ever taking the quarry out of the sight of the firearm.

The first bracket, generally A, is comprised of a bifurcated hose clamp 1, an elastic strap 2 connected to one end of the hose clamp 1, a loop 3 attached to the opposite end of the elastic strap 2, and a hook 4 attached to the other end of the bifurcated hose clamp 1. The bifurcated hose clamp 1 may be fabricated, for example, from a 2- to 4-inch diameter standard hose clamp by removing one-third to one-half of the strap of the hose clamp opposite to the tightening mechanism of the clamp 5. Since a standard hose clamp features a series of parallel slots extending around the complete circumference of the clamp, the elastic strap 2 may be attached by sewing one end of the strap to a parallel slot on one end of the clamp. Likewise, the hook 4 may be mechanically attached through a parallel slot on the opposite side of the bifurcated hose clamp. The loop 3 may be attached to the elastic strap by sewing. Other clamping means well known to those skilled in the art may be employed for the first bracket, provided the first bracket can be securely clamped to the front butt of the firearm.

In a preferred embodiment of the invention, operation of the tightening mechanism of the hose clamp 5 is facilitated by attaching a wingnut 6 to the head of the screw of the tightening mechanism 5. This wingnut 6 allows the first bracket to be tightened around the front of the butt of the shotgun without the use of any hand tools. The wingnut 6 is attached to the head of the tightening screw by means of a first bolt with a thumb wheel 7 so that the wingnut 6 can be disengaged if desired from the screw of the tightening mechanism 5 to reduce the possibility of accidental loosening of the bifurcated hose clamp 1 after the bracket is tightened to the butt of a shotgun. Preferably, leather strap 8 is sewn onto the inside of the hose clamp through available openings or slots in the clamp to prevent the bifurcated hose clamp 1 from damaging the butt of the shotgun when the first bracket is attached to the butt.

The bifurcated hose clamp 1 is attached to the second bracket, generally B, that holds the turkey call by means of a threaded compression fitting with a thumb wheel 9 so that the two brackets can be connected together without the use of any outside tools. The use of the threaded compression fitting 9 to connect the two brackets also allows for an adjustment between the angle of the connected brackets so that the two brackets can be properly aligned to position the turkey call.

The second bracket comprises a 90° angle rod 10, connected to the bifurcated hose clamp 1 by means of the threaded compression fitting with the thumb wheel 9, and an adjustable clamp 11 that is connected to the opposite end of the 90° angle rod 10. The adjustable clamp 11 is sized to hold most available animal calls, including a typical rectangularly shaped turkey call. The adjustable clamp 11 is adjusted to hold the turkey call by means of thumb wheel 12 so that the turkey call can be positioned and held in place without the use of any hand tools. The opposing jaws of the clamp 11 are formed by two 90° angle clamp brackets 13 that are sized to firmly hold the rectangularly shaped turkey call. These clamp brackets 13 can be removed and replaced with semicircular clamp brackets to form the jaws of the clamp when using the adapter on a round animal call. The surfaces the clamp brackets are preferably covered with a fine grade sandpaper 14 to insure a firm grip on the animal call.

The activating means for activating the turkey call, generally C, is attached to the adjustable clamp 11 by a second bolt with a thumb wheel 15 so that the activating means can be attached without the use of any hand tools. This means of attachment also allows the angle between the adjustable clamp and the activating means to be adjusted in the field to provide for proper alignment of the adapter.

The activating means of the animal call comprises a straight rod member 16 with a longitudinally slotted end 17, through which the second bolt with a thumb wheel 15 connects the activating means to the adjustable clamp 11, and an extended trigger 18 connected to the straight rod member 16 by a swivel mechanism 19 so that the extended trigger is free to move back and forth against the activator of the turkey call. The extended trigger 18 has a threaded segment 20 that connects to a female threaded receptor in the swivel connection 19 so that the extended trigger can be installed in the field without any hand tools. The extra length of this threaded segment 20 beyond that required to merely connect to the swivel connection 19 is used to adjust the length of the extended trigger 18 so that the end of the extended trigger 18 is adjacent to the trigger area of the shotgun. The swivel connection 19 also features a stop device 21 that is connected to the swivel connection 19 by means of a third bolt with a thumb screw 22 so that the stop 21 can be adjusted in the field without any hand tools. The stop device 21 is positioned on the swivel and then held in place by tightening the third bolt with a thumb screw 22 so that the extended trigger 18 can move only through the range of motion required to operate the activator of the animal call.

All of the foregoing components of the adapter are preferably made from components with a flat black finish. This finish minimizes reflections from the sun that could alert and frighten away the quarry.

While a presently preferred embodiment of practicing the invention has been shown and described with particularity in connection with the accompanying drawings, the invention may otherwise be embodied within the scope of the following claims:

What is claimed is:

1. An adapter for attaching an animal call to a firearm with a trigger area comprising: (a) a first bracket that is capable of being attached to the firearm: (b) a second bracket, connected to the first bracket, said second bracket being capable of holding an animal call means; and (c) an activating means for activating the animal call means, said activating means being attached to the second bracket, and extending from the second bracket to the trigger area of the firearm.

2. The adapter as described in claim 1 wherein the first bracket comprises (a) a flexible strap that wraps around the front of the butt of said firearm and (b) means for tightening said flexible strap to hold the adapter firmly in place on the butt of the firearm.

3. The adapter as described in claim 2 wherein the first bracket comprises (a) a bifurcated hose clamp adapted to slip over the front of the butt of said firearm, (b) an elastic strap that attaches to one end of said bifurcated hose clamp and has a loop attached to its opposite end, and (c) a hook attached to the other end of said bifurcated hose clamp, said hook adapted to be attached to said loop to close the hose clamp before said tightening means is adjusted to attach said first bracket firmly around the front of the butt of the firearm.

4. The adapter as described in claim 3 wherein a wingnut is attached to the head of said tightening means to facilitate tightening the first bracket firmly around the front of the butt of a firearm without the use of hand tools.

5. The adapter as described in claim 4 wherein said tightening means comprises a tightening screw and the wingnut is attached to the head of the tightening screw by means of a first bolt with a thumb wheel, enabling the wingnut to be disengaged from the tightening screw, thereby minimizing to possibility of accidental loosening of the hose clamp.

6. The adapter as described in claim 3 wherein the bifurcated hose clamp is lined with a soft material to avoid damage to the butt of the firearm when the first bracket is attached to the firearm.

7. The adapter as described in claim 1 wherein the second bracket is connected to the first bracket by means of a threaded compression fitting with a thumb wheel so that the two brackets can be connected together without the use of hand tools and so that the angle between the two brackets can be adjusted to provide for proper alignment of the adapter.

8. The adapter as described in claim 1 wherein the second bracket comprises (a) a 90° angle rod that connects to the first bracket on one end and (b) an adjustable clamp, connected to the opposite end of the 90° angle rod, said adjustable clamp being sized to hold said animal call.

9. The adapter as described in claim 8 wherein the adjustable clamp is positioned by means of a thumb wheel so that the animal call can be positioned and held in place without the use of hand tools.

10. The adapter as described in claim 8 wherein the adjustable clamp uses two 90° angle clamp brackets mounted on the opposite jaws of the clamp and facing each other to firmly hold a rectangularly shaped animal call.

11. The adapter as defined in claim 10 wherein the 90° angle clamp brackets are removable and interchangeable with semicircular clamp brackets to accommodate round animal calls.

12. The adapter as described in claim 8 wherein the surfaces of the adjustable clamp that contact the animal call are covered with a fine grade sandpaper to insure a firm grip on the animal call.

13. The adapter as described in claim 1 wherein the entire adapter is made from components with a flat black finish that will not cause reflections that could alert and frighten away the quarry.

14. An adapter for attaching an animal call to a firearm with a trigger area comprising: (a) a first bracket that is capable of being attached to the firearm; (b) a second bracket, connected to the first bracket, said second bracket being capable of holding an animal call means; and (c) an activating means for activating the animal call means, said activating means being attached to the second bracket, and extending from the second bracket to the trigger area of the firearm, said activating means further being attached to said second bracket by a second bolt with a thumb wheel such that said activating means can be attached without the use of any hand tools and such that said second bracket and said activating means can be adjusted relative to one another in order to provide for alignment of said adapter.

15. The adapter as described in claim 14 wherein the activating means comprises (a) a straight rod member with a longitudinally slotted end that is connected to said second bracket by said second bolt with a thumb wheel, said second bolt passing slidably through said slot so that the distance between said activating means and an activator of the animal call can be adjusted to fit variously sized animal calls and (b) an extended trigger connected to the straight rod member by a swivel mechanism so that the extended trigger is free to move back and forth against the activator of the animal call.

16. The adapter as described in claim 15 wherein the end of the extended trigger has a threaded segment that connected to a female threaded receptor in the swivel mechanism so that the extended trigger can be installed and adjusted to the proper length in the field without the use of hand tools.

17. The adapter as described in claim 15 wherein the swivel mechanism has a stop device, connected to the swivel mechanism by means of a third bolt with a thumb screw so that the stop can be adjusted in the field without hand tools, said stop device limiting the movement of the swivel mechanism so that the extended trigger can move only through the range of motion required to operate the activator of the animal call.

* * * * *